US012681555B2

(12) United States Patent      (10) Patent No.:    US 12,681,555 B2

Lovell et al.            (45) Date of Patent:       Jul. 14, 2026

(54) SYSTEMS AND METHODS FOR REDUCING POWER CONSUMPTION IN COMPUTE CIRCUITS

(71) Applicant: Maxim Integrated Products, Inc., San Jose, CA (US)

(72) Inventors: Mark Alan Lovell, Lucas, TX (US); Robert Michael Muchsel, Addison, TX (US)

(73) Assignee: Maxim Integrated Products, Inc., San Jose, CA (US)

( * ) Notice: Subject to any disclaimer, the term of this patent is extended or adjusted under 35 U.S.C. 154(b) by 1300 days.

(21) Appl. No.: 17/355,470

(22) Filed: Jun. 23, 2021

(65) Prior Publication Data

US 2022/0413590 A1      Dec. 29, 2022

(51) Int. Cl.
| | |
|---|---|
| *G06F 1/3287* | (2019.01) |
| *G06F 1/329* | (2019.01) |
| *G06F 1/3293* | (2019.01) |
| *G06N 3/04* | (2023.01) |
| *G06N 3/08* | (2023.01) |

(52) U.S. Cl.
CPC ............ *G06F 1/3287* (2013.01); *G06F 1/329* (2013.01); *G06F 1/3293* (2013.01); *G06N 3/04* (2013.01); *G06N 3/08* (2013.01)

(58) Field of Classification Search
CPC ...... G06F 1/3287; G06F 1/329; G06F 1/3293; G06N 3/04; G06N 3/08; G06N 3/045; G06N 3/0464; G06N 3/063; Y02D 10/00
See application file for complete search history.

(56) References Cited

U.S. PATENT DOCUMENTS

| | | | |
|---|---|---|---|
| 7,685,215 B1 * | 3/2010 | Gaide | G06F 7/508 |
| | | | 708/700 |
| 8,572,153 B1 * | 10/2013 | New | G06F 7/523 |
| | | | 708/622 |
| 9,680,493 B1 * | 6/2017 | Pritsker | H03M 1/0629 |
| 10,694,399 B1 * | 6/2020 | Tran | H01Q 3/01 |
| 2004/0078608 A1 * | 4/2004 | Kanapathippillai | G06F 1/3253 |
| | | | 712/E9.058 |
| 2014/0075218 A1 * | 3/2014 | Bartling | G11C 14/00 |
| | | | 713/320 |

(Continued)

FOREIGN PATENT DOCUMENTS

| | | | | |
|---|---|---|---|---|
| CN | 108631736 A | * 10/2018 | ........... | H03F 1/0205 |
| DE | 102018125236 A1 | * 5/2019 | ....... | G01R 31/31721 |

(Continued)

*Primary Examiner* — Jaweed A Abbaszadeh

(74) *Attorney, Agent, or Firm* — Schwegman Lundberg & Woessner, P.A.

(57) ABSTRACT

Systems and methods increase computational efficiency in machine learning accelerators. In embodiments, this is accomplished by evaluating, partitioning, and selecting computational resources to uniquely process, accumulate, and store data based on the type of the data and configuration parameters that are used to process the data. Various embodiments, take advantage of the zeroing feature of a Built-In Self-Test (BIST) controller to cause a BIST circuit to create a known state for a hardware accelerator, e.g., during a startup and/or wakeup phase, thereby, reducing data movements and transitions to save both time and energy.

20 Claims, 8 Drawing Sheets

300

(56)                    References Cited

U.S. PATENT DOCUMENTS

| | | | | |
|---|---|---|---|---|
| 2019/0034367 | A1* | 1/2019 | Kakaiya | G06F 12/1036 |
| 2019/0079575 | A1* | 3/2019 | Hanson | G06F 1/3287 |
| 2019/0205244 | A1* | 7/2019 | Smith | G06F 3/065 |
| 2019/0243930 | A1* | 8/2019 | Wu | G06F 21/568 |
| 2019/0339687 | A1* | 11/2019 | Cella | G06Q 30/02 |
| 2019/0378682 | A1* | 12/2019 | Wang | G01T 1/247 |
| 2020/0394507 | A1* | 12/2020 | He | G06N 3/045 |

FOREIGN PATENT DOCUMENTS

| | | | | | |
|---|---|---|---|---|---|
| KR | 20200047551 | A | * | 5/2020 | G06N 3/04 |
| WO | WO-2007036834 | A2 | * | 4/2007 | G06F 11/1008 |
| WO | WO-2011057287 | A1 | * | 5/2011 | A63F 13/06 |
| WO | WO-2019040054 | A1 | * | 2/2019 | G06F 1/3243 |

* cited by examiner

100

300

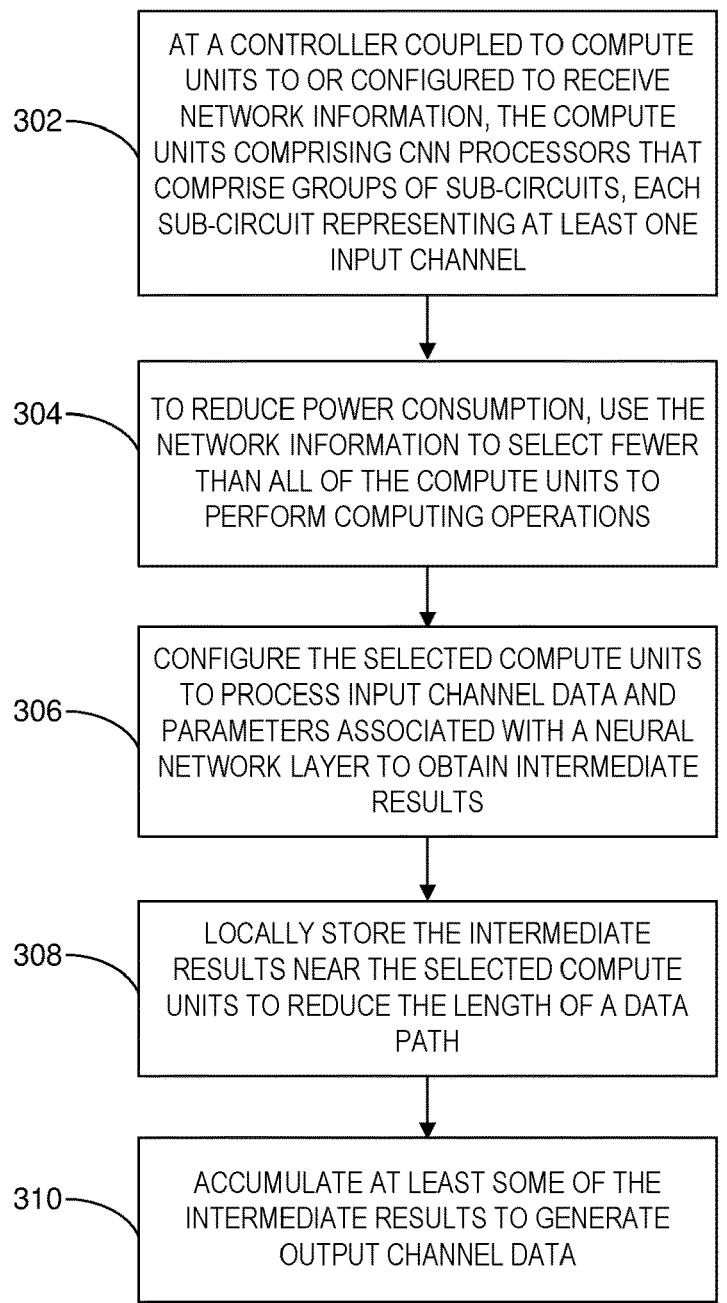

302 — AT A CONTROLLER COUPLED TO COMPUTE UNITS TO OR CONFIGURED TO RECEIVE NETWORK INFORMATION, THE COMPUTE UNITS COMPRISING CNN PROCESSORS THAT COMPRISE GROUPS OF SUB-CIRCUITS, EACH SUB-CIRCUIT REPRESENTING AT LEAST ONE INPUT CHANNEL

304 — TO REDUCE POWER CONSUMPTION, USE THE NETWORK INFORMATION TO SELECT FEWER THAN ALL OF THE COMPUTE UNITS TO PERFORM COMPUTING OPERATIONS

306 — CONFIGURE THE SELECTED COMPUTE UNITS TO PROCESS INPUT CHANNEL DATA AND PARAMETERS ASSOCIATED WITH A NEURAL NETWORK LAYER TO OBTAIN INTERMEDIATE RESULTS

308 — LOCALLY STORE THE INTERMEDIATE RESULTS NEAR THE SELECTED COMPUTE UNITS TO REDUCE THE LENGTH OF A DATA PATH

310 — ACCUMULATE AT LEAST SOME OF THE INTERMEDIATE RESULTS TO GENERATE OUTPUT CHANNEL DATA

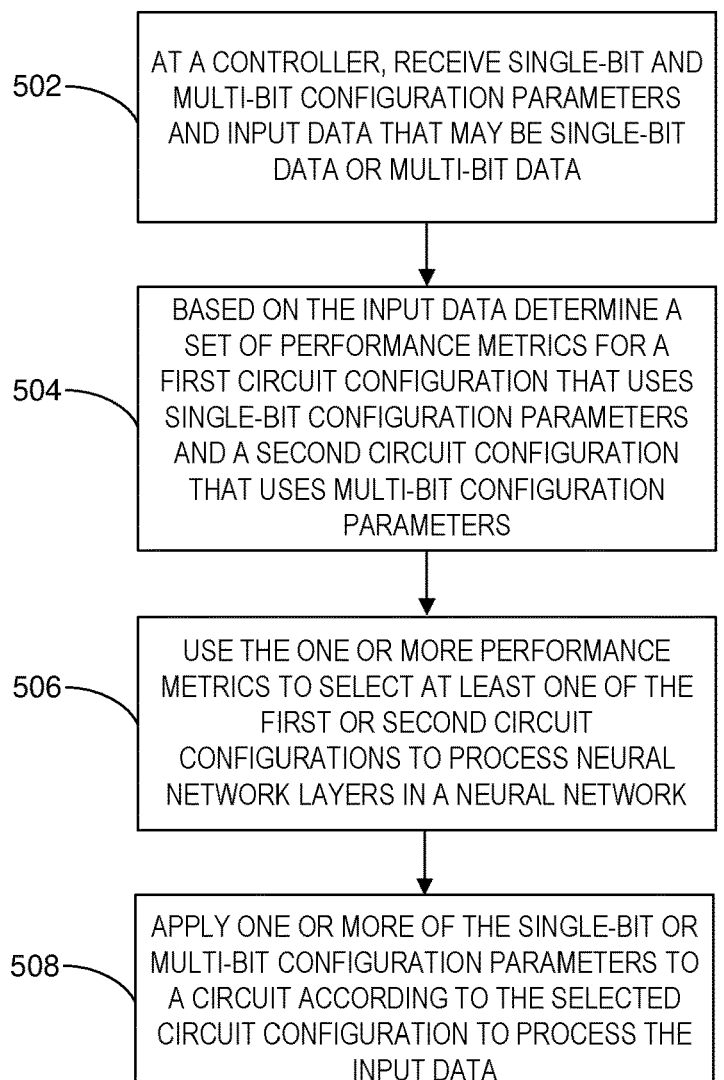

502 — AT A CONTROLLER, RECEIVE SINGLE-BIT AND MULTI-BIT CONFIGURATION PARAMETERS AND INPUT DATA THAT MAY BE SINGLE-BIT DATA OR MULTI-BIT DATA

504 — BASED ON THE INPUT DATA DETERMINE A SET OF PERFORMANCE METRICS FOR A FIRST CIRCUIT CONFIGURATION THAT USES SINGLE-BIT CONFIGURATION PARAMETERS AND A SECOND CIRCUIT CONFIGURATION THAT USES MULTI-BIT CONFIGURATION PARAMETERS

506 — USE THE ONE OR MORE PERFORMANCE METRICS TO SELECT AT LEAST ONE OF THE FIRST OR SECOND CIRCUIT CONFIGURATIONS TO PROCESS NEURAL NETWORK LAYERS IN A NEURAL NETWORK

508 — APPLY ONE OR MORE OF THE SINGLE-BIT OR MULTI-BIT CONFIGURATION PARAMETERS TO A CIRCUIT ACCORDING TO THE SELECTED CIRCUIT CONFIGURATION TO PROCESS THE INPUT DATA

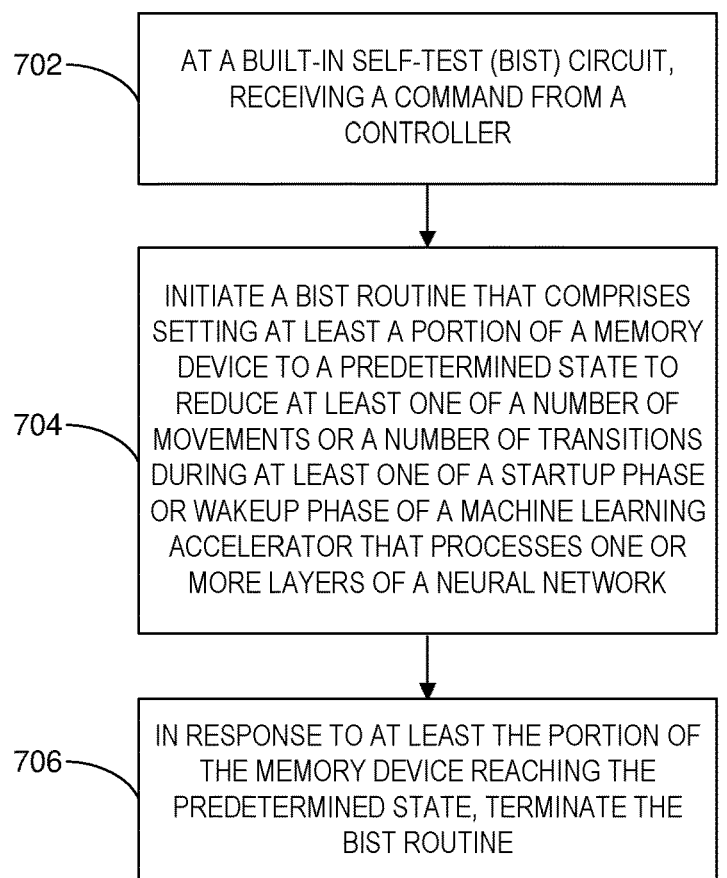

702 — AT A BUILT-IN SELF-TEST (BIST) CIRCUIT, RECEIVING A COMMAND FROM A CONTROLLER

704 — INITIATE A BIST ROUTINE THAT COMPRISES SETTING AT LEAST A PORTION OF A MEMORY DEVICE TO A PREDETERMINED STATE TO REDUCE AT LEAST ONE OF A NUMBER OF MOVEMENTS OR A NUMBER OF TRANSITIONS DURING AT LEAST ONE OF A STARTUP PHASE OR WAKEUP PHASE OF A MACHINE LEARNING ACCELERATOR THAT PROCESSES ONE OR MORE LAYERS OF A NEURAL NETWORK

706 — IN RESPONSE TO AT LEAST THE PORTION OF THE MEMORY DEVICE REACHING THE PREDETERMINED STATE, TERMINATE THE BIST ROUTINE

SYSTEMS AND METHODS FOR REDUCING POWER CONSUMPTION IN COMPUTE CIRCUITS

BACKGROUND

A. Technical Field

The present disclosure relates generally to data processing in machine-learning applications. More particularly, the present disclosure relates to systems and methods for reducing power consumption in compute circuits, such as machine learning accelerators.

B. Background

Machine learning is a subfield of artificial intelligence that enables computers to learn by example without being explicitly programmed in a conventional sense. Numerous machine learning applications utilize a Convolutional Neural Network (CNN), i.e., a supervised network that is capable of solving complex classification or regression problems, for example, for image or video processing applications. A CNN uses as input large amounts of multi-dimensional training data, such as image or sensor data to learn prominent features therein. A trained network can be fine-tuned to learn additional features. In an inference phase, i.e., once training or learning is completed, the CNN uses unsupervised operations to detect or interpolate previously unseen features or events in new input data to classify objects, or to compute an output such as a regression. For example, a CNN model may be used to automatically determine whether an image can be categorized as comprising a person or an animal. The CNN applies a number of hierarchical network layers and sub-layers to the input image when making its determination or prediction. A network layer is defined, among other parameters, by kernel size. A convolutional layer may use several kernels that apply a set of weights to the pixels of a convolution window of an image. For example, a two-dimensional convolution operation involves the generation of output feature maps for a layer by using data in a two-dimensional window from a previous layer. As the amount of data subject to convolution operations increases and the complexity of operations continues to grow, the added steps of storing and retrieving intermediate results from memory to complete an arithmetic operation present only some of the shortcoming of existing designs.

Accordingly, what is needed are systems and methods that allow hardware, including conventional hardware accelerators, to efficiently perform a myriad of complex processing steps on large amounts of data at low power and, ideally, without increasing hardware cost.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures are not to scale.

FIG. 3 is a flowchart of an illustrative process for partitioning computational resources according to various embodiments of the present disclosure.

FIG. 5 is a flowchart of an illustrative process for increasing computational efficiency according to various embodiments of the present disclosure.

FIG. 7 is a flowchart of an illustrative process for reducing power consumption in according to various embodiments of the present disclosure.

DETAILED DESCRIPTION OF EMBODIMENTS

Figure 1:
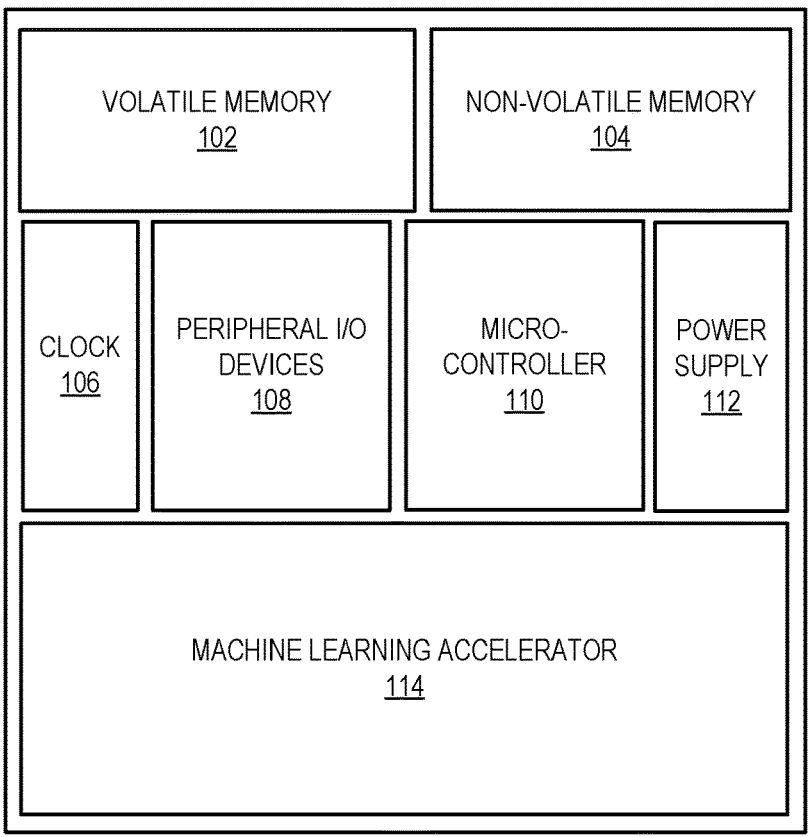
FIG. 1 shows a conventional embedded machine learning accelerator system.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "include," "including," "comprise," and "comprising" shall be understood to be open terms and any lists the follow are examples and not meant to be limited to the listed items. Any headings used herein are for organizational purposes only and shall not be used to limit the scope of the description or the claims. Each reference/document mentioned in this patent document is incorporated by reference herein in its entirety.

It shall be noted that embodiments described herein are given in the context of embedded machine learning accelerators, but one skilled in the art shall recognize that the teachings of the present disclosure are not so limited and may equally reduce power consumption in related or other devices.

In this document the terms "memory," "memory device," and "register" are used interchangeably. Similarly, the terms kernel, filter, weight, parameter, and weight parameter are used interchangeably. The term "layer" refers to a neural network layer. "Neural network" includes any neural network known in the art. The term "hardware accelerator" refers to any electrical or optical circuit that may be used to perform mathematical operations and related functions, including auxiliary control functions. "Circuit" includes "sub-circuits" and may refer to both custom circuits, such as special hardware, and general purpose circuits.

FIG. 1 illustrates a conventional embedded machine learning accelerator system that processes data in multiple stages. System 100 contains volatile memory 102, non-volatile memory 104, clock 106, clock I/O peripherals, microcontroller 110, power supply 112, and machine learning accelerator 114. Microcontroller 110 can be a traditional DSP or general-purpose computing device, machine learning accelerator 114 can be implemented as a CNN accelerator that comprises hundreds of registers (not shown). As depicted in FIG. 1, machine learning accelerator 114 interfaces with other parts of embedded machine learning accelerator system 100.

In operation, microcontroller 110 performs arithmetic operations in software. Machine learning accelerator 114 typically uses weight data to perform matrix-multiplications and related convolution computations on input data to which weight data is applied. The weight data may be unloaded from accelerator 114, for example, to load new or different weight data prior to accelerator 114 performing a new set of operations using the new set of weight data. More commonly, the weight data remains unchanged, and each new computation comprises new input data being loaded into accelerator 114 to perform computations.

Machine learning accelerator 114 lacks hardware acceleration for at least some of a number of possible neural network computations. These missing operators are typically emulated in software by using software functions embedded in microcontroller 110. However, such approaches are very costly in terms of both power and time; and for many computationally intensive applications, such as real-time applications, general purpose computing hardware is unable to perform the necessary operations in a timely manner as the rate of calculations is limited by the computational resources and capabilities of existing hardware designs.

Further, using arithmetic functions of microcontroller 110 to generate intermediate results comes at the expense of computing time due to the added steps of transmitting data, allocating storage, and retrieving intermediate results from memory locations to complete an operation. For example, many conventional multipliers are scalar machines that use CPUs or GPUs as their computation unit and use registers and a cache to process data stored in non-volatile memory, relying on a series of software and hardware matrix manipulation steps, such as address generation, transpositions, bit-by-bit addition and shifting, converting multiplications into additions and outputting the result into some internal register. In practice, these repeated read/write operations performed on a significant amount of weight parameters and input data with large dimensions and/or large channel count typically result in undesirable data movements in the data path and, thus, increase power consumption.

There exist no mechanisms to efficiently select and use data, while avoiding generating redundant data or avoiding accessing data in a redundant fashion. Software must access the same locations of a standard memory and read, re-fetch, and write the same data over and over again even when performing simple arithmetic operations, which is computationally very burdensome and creates a bottleneck that reduces the system's usability for machine learning applications. Accordingly, the computational complexity involved in convolution and other operations performed by CNNs and excessive power consumption associated therewith makes more efficient hardware acceleration and power-saving particularly desirable.

Movement Distance and Processor Scaling

Conventional embedded hardware accelerators for machine learning applications are inherently limited to a fixed number of available computational resources. Such resources include storage or memory resources that store kernels and other network parameters. In many applications, however, not all available resources that an accelerator has been designed for are needed to generate satisfactory results. For example, operating and maintaining, at all times, all available computational resources that are present in a computing system, such as multi-core system, unnecessarily increases computing costs and wastes power.

Some existing approaches attempt to reduce overall power consumption by employing methods such as turning off or putting into sleep mode a hardware accelerator or even an entire chipset when it is not in use. However, the power savings that can be achieved by these approaches are relatively minor, especially when compared to the amount of power a system uses when in active mode. In addition, such approaches cannot significantly reduce overhead associated with making all computational resources in the system available in active mode.

It would be desirable to optimize the use of available computational resources and drastically reduce power consumption by having systems and methods that by design allow for portions of the entirety of available computing resources to be turned off or put in a low-power mode in as many circumstances as possible, without negatively affecting the overall operation or performance of the computing system.

Various embodiments presented herein accomplish this by partitioning computational resources and network parameters for a neural network, e.g., a CNN, in a systematic manner. In embodiments, a computing system may be partitioned into any number of interconnected computing units, e.g., CNN processors (or tiles) that each may comprise a group of sub-circuits or local processors such that in operation, in circumstances when a particular application does not require all computing resources in the computing system to be available, or when operating at lower computing power or throughput is acceptable, unused computing units, i.e., tiles, sub-circuits, or groups of sub-circuits in the computing system may be disabled, deenergized, powered down, or not activated in the first place.

In embodiments, to further decrease computation cost, enhance throughput, and reduce system power, the physical distance between a given computation circuit, such as an individual tile, weight parameters associated therewith, and source data that the computation circuit operates on may be reduced. In embodiments, this is achieved by distributing computation operations to a set of relatively small compute units, e.g., sub-circuits that employ localized circuitry capable of independently performing operations on neural network layers. As a result, the distance and time that data has to travel across circuitry and, thus, the associated computationally expensive data movements, such as those requiring read, write, buffer, and data storage operations, are successfully reduced.

In addition, distributed processing using localized circuitry, advantageously, allows for better scalability since the number of processors in a system may be increased in a modular fashion without aggravating the data movement problem and without significantly impacting overall system performance, especially, when compared to traditional architectures in which a great amount of data has to travel to and from a centralized processor.

Figure 2:
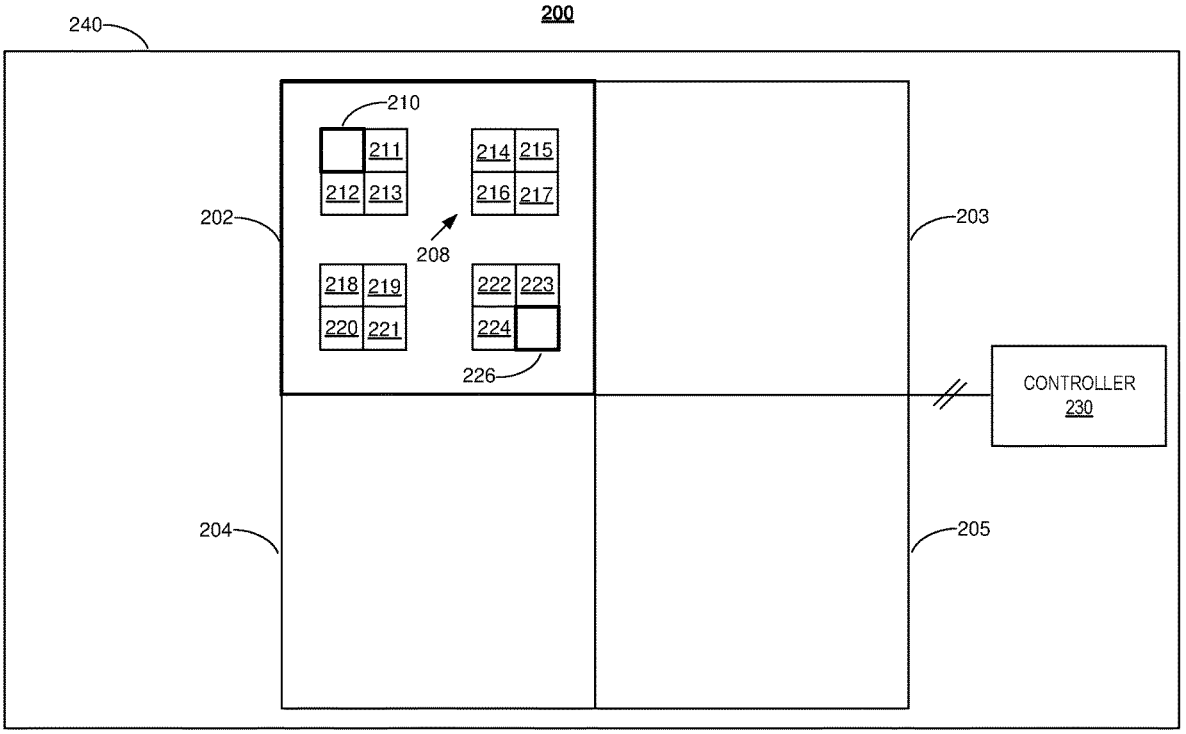
FIG. 2 illustrates a block diagram of an exemplary computing architecture for partitioning computational resources to conserve power according to embodiments of the present disclosure.

FIG. 2 illustrates a block diagram of an exemplary computing architecture for partitioning computational resources to conserve power according to embodiments of the present disclosure. In embodiments, computing architecture 200 is disposed on die 240 and may comprise various compute units, such as CNN processors 202-205 that each may comprise local processors 210-225 or sub-circuits. As depicted, local processors 210-225 may be grouped into groups (e.g., 208) of local processors. In embodiments, each compute unit on die 240 may be coupled to each other directly or indirectly, e.g., via feedback loops (not shown). In embodiments, weight memory and data memory (not shown) may be coupled to each of local processors 210-225, which may share a common local memory, e.g., a RAM. Advantageously, storing data in proximity to a computational circuit that, in operation, uses that data reduces the distance that the data has to travel, thus, reducing power consumption.

It is understood that while only one die 240 is illustrated in FIG. 2, this is not intended as a limitation on the scope of the present disclosure as any number of compute units, e.g., CNN processors 202-205, may be implemented on two or more dies. For example, in embodiments, to increase computing resources and, thus, capabilities, any number of sets of tiles may be disposed on a single die, or across several dies, without having to fundamentally redesign the basic circuit layout. Further, dies may be connected to each other using external pins or any other method known in the art.

In operation, one of local processors 210-225 may act as a main or master local processor (e.g., 210) that communicates with any number of local processors. Similarly, one of CNN processors 202-205 may act as a main CNN processor (e.g., 202) that communicates with any number of other processors. In embodiments, each of local processors 210-225 may represent a different input channel, such that disabling one of local processors 210-225 disables an input channel associated therewith. It is understood that the number of processors in a given system architecture may be balanced against the number of control signals that are passed to a centralized or master processor.

In embodiments, each CNN processor 202-205 may act as at least partially independent computing unit that may be assigned a dedicated task, such as performing operations on some or all of an entire CNN network. For example, in embodiments, each CNN processor 202-205 may perform operations on an independent neural network layer. It is understood that any number of operations may be performed in parallel. In embodiments, each localized processor 210-225 in a group (e.g., 208) of processors may perform, among other things, a sum-of-products computation on input channel and weight data. The results, which may be viewed as intermediate results, e.g., single-value results, may be passed to main local processor 210.

In embodiments, main local processor 210 may collect and dynamically combine the outputs from each of the local processors 210-225, e.g., by accumulating them in a round-robin fashion, to generate an overall result for CNN processor 202 that may be stored in memory. Similarly, main CNN processor 202 may generate an output, e.g., by combining the outputs of CNN processors 202-205. As an example, 16 sum-of-products for each of the four CNN processors 202-205 may be calculated in parallel to obtain 64 sums-of-products, e.g., for a 3×3 filter, until a stop condition has been reached.

It is understood that, in embodiments, intermediate results from any number of local processors 210-225 and CNN processors 202-205 may be dynamically combined in any suitable manner. For example, for a given application, one or more CNN processors (e.g., 202 and 204) may be used to generate audio data, and one or more CNN processors (e.g., 203 and 205) may generate video data that then may be aligned with the audio data to generate a combined output. Further, in embodiments, although each CNN processor 202-205 may be configured to operate independently and perform independent CNN operations, CNN processors 202-205 may be combined and scaled up to increase the computing power of the overall system. In embodiments, local processors 210-225 and/or CNN processors 202-206 may be disabled individually or in combination, e.g., depending on a number of input channels that computing architecture 200 receives for processing at any given time for a particular application.

In embodiments, controller 230 may be used to distribute any number of channels across any number of local processors 210-225 and/or CNN processors 202-206 that may process one or more channels at a time and one or more channels at another time. In embodiments, controller 230 may further select any number of CNN processors 202-205 and determine which of CNN processors 202-205 should process a certain layer within a CNN to produce a desired result, e.g., before controller 230 instructs the selected combination to process the layer. Controller 230 may do so by taking into account parameters such as capacities, e.g., throughput, and availability of each processor, type of application, network layer information, information regarding processed data, and configuration information such as, e.g., input or output data sizes. For example, a "type of application" consideration may comprise evaluating whether one circuit or processor should be used more often for one application or task than another circuit.

Controller 230 may further use at least some of these parameters to estimate how long certain processes take for various possible combinations, e.g., to evaluate a power demand. For example, controller 230 may determine that operating four processors (e.g., 210-213) one time is computationally less expensive than operating one processor (e.g., 210) four times to obtain the same result and dynamically schedule and prioritize processors accordingly, e.g., to reduce overall system power consumption. In embodiments, controller 230 may select one or more CNN processors, e.g., 202, to perform dedicated tasks and cause the remaining processors 203-205 to be deenergized to save power, for example, for instances when less computing power is acceptable.

As a person of skill in the art will appreciate, deenergizing a processor or sub-processor may comprise, at least partially, turning of power, entering into a sleep mode, and so on, e.g., by utilizing switches or individual power supply connections.

In embodiments, a selected circuit may have different capabilities than a non-selected circuit. For example, a relatively smaller circuit may be selected to save power. Or a circuit may be optimized to process specific types of input data, for example, a circuit that is customized to process multiples of 64 channels. Such types of input data may comprise predetermined configuration parameters, which reduce configuration time and power. In addition, circuit selection may, advantageously, result in reduced power consumption and increased speed or throughput.

In embodiments, controller 230 may determine which circuit to select and under which circumstances, including when to switch back to a previously used circuit, e.g., a general purpose processor. In embodiments, circuit selection may be accomplished by using a logic element, such as an XOR circuit.

FIG. 3 is a flowchart of an illustrative process for partitioning computational resources to conserve power according to various embodiments of the present disclosure. In embodiments, process 300 may begin, at step 302, when network information is received by a controller that may be coupled to any number of compute units. Each compute unit may comprise a number of CNN processors that each, in turn, may comprise any number of sub-circuits, which may be grouped together into one or more groups. In embodiments, sub-circuits may represent one or more input channels at any given time.

At step 304, controller may use the network information to decide which compute units to select such as to reduce power consumption. For example, in embodiments, the controller may select fewer than all compute units to perform certain computing operations. It is understood that this is not intended as a limitation, since the controller may select all available compute units, under certain circumstances.

At step 306, the controller may use the network information to configure one or more of the selected processors, the groups of sub-circuits, or the sub-circuits to process input channel data and/or parameters associated with a neural network layer, e.g., to obtain intermediate results. In embodiments, the controller may use power consumption, distance, or other suitable metrics to decide where to store or cache the intermediate results.

At step 308, the controller may locally store or cache intermediate results near the previously selected compute units, e.g., to reduce a length of a data path to or from the selected compute units.

Finally, at step 310, the controller may cause less than all of the processors, the groups of sub-circuits, or the sub-circuits to accumulate at least some of the intermediate results that may be used, e.g., to generate output channel data.

Single-Bit Computation

It is noted that while various embodiments may use multi-bit weight parameters and/or multi-bit input data to maintain high accuracy, especially for computationally relatively easily feasible software implementations, hardware embodiments herein may equally benefit from single-bit processing embodiments.

Although embodiments herein are given mainly in the context of single-bit weight parameters and/or single-bit input data, this is not intended as a limitation on the scope of the present disclosure. In fact, in embodiments, equal or even better results may be achieved by using variable data and/or variable network parameter sizes across a given machine learning process, for example, by allowing configurability on a per-layer basis, as discussed in greater detail below.

It is noted that single-bit computation differs significantly from multi-bit computation. In embodiments, circuitry may be dynamically selected based on a per-layer data and/or weight parameter configuration associated with a neural network. This further reduces power consumption and increases speed or throughput.

Figure 4:
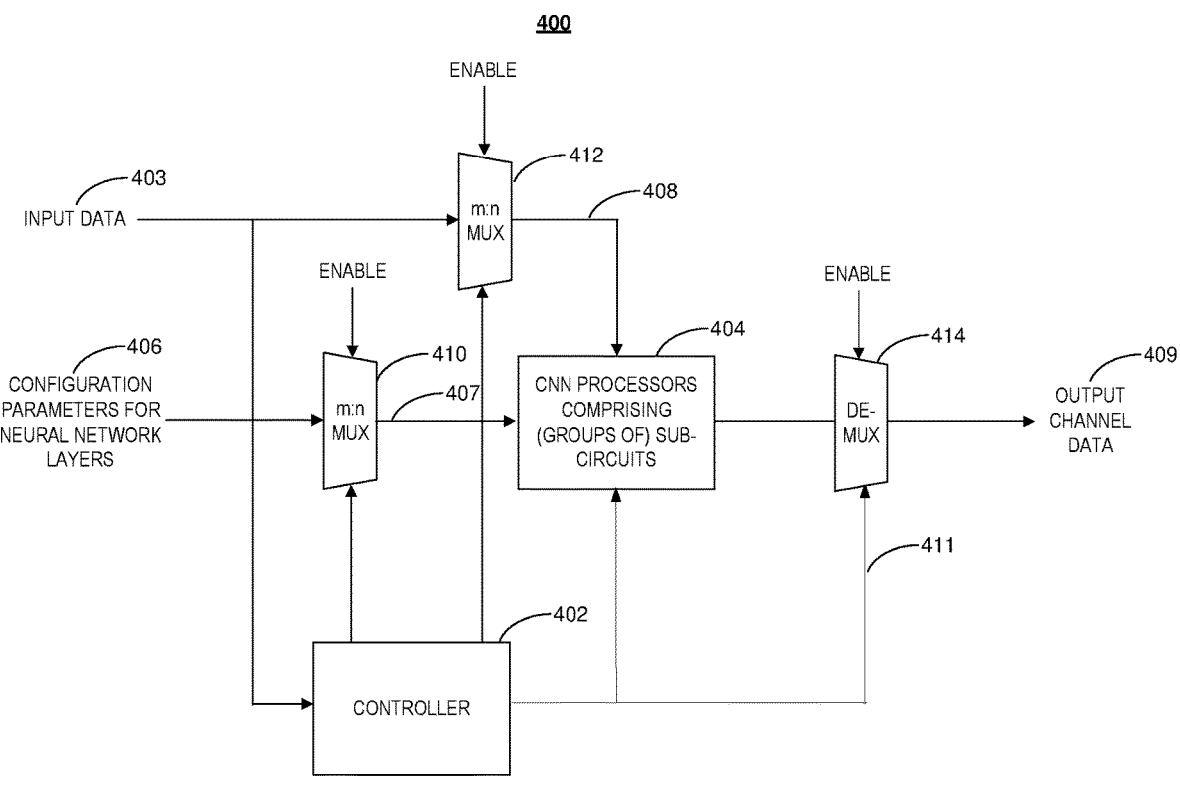
FIG. 4 is a block diagram of an exemplary circuit for dynamically selecting an optimized circuit according to various embodiments of the present disclosure.

FIG. 4 is a block diagram of an exemplary circuit for dynamically selecting an optimized circuit according to various embodiments of the present disclosure. As depicted in FIG. 4, circuit 400 may comprise controller 402, CNN processor 404, multiplexers 410-412, and demultiplexers 414. In embodiments, controller 402 may be coupled to receive configuration parameters 406 may also be inputs to multiplexer 410. Exemplary configuration parameters may be single-bit and/or multi-bit configuration parameters and have varying size. Multiplexer 410 may be coupled to any number of CNN processors 404 that receive input data 403 via multiplexer 412, e.g., single-bit and/or multi-bit variable data that may be pre-selected by controller 402.

In embodiments, CNN processor 404 may be implemented as a single hardware accelerator architecture, or CNN processor 404 may comprise two or more circuits through which data may be routed. For example, one circuit may be a dedicated or standalone circuit that may be optimized for a specific task or to accommodate a particular performance metric, such as a power consumption, an output accuracy, a processing speed or throughput, or a processing capability (e.g., fixed size inputs). Another circuit may be a common hardware accelerator circuit.

In operation, controller 402 may receive configuration parameters 406, e.g., from a storage register and use them, together with information about input data 403, e.g., to determine whether input data 403 comprises single-bit data or multi-bit data and to determine a number of performance metrics, which may comprise calculated, measured, or estimated/expected values.

In embodiments, based on the performance metrics, controller 402 may determine and select a circuit configuration of CNN processors 404 from a number of possible configurations. Further, controller 402 may dynamically select configuration parameters 406 such as to prevent certain configuration parameters 406 from being processed by CNN processors 404. Similarly, controller 402 may actively suppress certain types of input data from being used or processed by CNN processors 404, e.g., on a per-layer basis, to reduce unnecessary data movements and power consumption.

For example, for portions of a neural network that have a certain bit width, controller 402 may dynamically select a low-power logic implementation, e.g., a circuit comprising combinational logic that carries less computational overhead, to perform certain operations, such as arithmetic computations, more efficiently, faster, and using less power when compared to comparable general-purpose implementations that employ general-purpose computing hardware, or even when compared to a full adder circuit or multiplier circuit.

Further, in embodiments, controller 402 may apply any number of selected configuration or network parameters 407, e.g., network parameters associated with an output from a network layer of a neural network, to a selected circuit configuration to process a subsequent layer of the network according to the selected configuration parameters 407 and/or selected input data 408. For example, to reduce a computational burden on CNN processors 404 and to increase throughput, controller 402 may select single-bit weight parameters over multi-bit weight parameters, e.g., at the expense of a slightly reduced accuracy. In embodiments, to accomplish this, prior to determining when to use a special purpose circuit, controller 402 may first determine whether a particular neural network layer processes single-bit data or single-bit weight parameters, e.g., by identifying data or weight parameter sizes/widths associated with a particular network layer.

In other words, controller 402 may determine when to use a special purpose circuit on a layer-by-layer basis. In embodiments, controller 402 may obtain layer specific information, e.g., from configuration information. It is noted that, even if the size of an input layer may be unknown, since hidden layers in a neural network are generated, advantageously, their size can be known.

It is understood that the output of CNN processors 404 may be routed through demultiplexer 414 to produce output channel data 409. It is further understood that circuit 400 illustrated in FIG. 4 is not limited to the constructional detail shown there or described in the accompanying text. Those skilled in the art will appreciate that a suitable circuit may comprise different or additional elements and/or connections, e.g., comparators, storage devices, and so on.

FIG. 5 is a flowchart of an illustrative process for increasing computational efficiency according to various embodiments of the present disclosure. In one or more embodiments, process 500 for increasing computational efficiency may begin, at step 502, when a controller receives a set of configuration parameters that also may comprise single-bit and/or multi-bit configuration parameters. The controller may further receive input data that may comprise single-bit and multi-bit input data.

At step 504, based on the input data, the controller may determine a number of performance metrics, such as a power consumption, an accuracy, or a throughput, for a circuit configuration that uses single-bit configuration parameters and for another circuit configuration that uses multi-bit configuration parameters At step 506, the controller may use the performance metrics to determine and/or select one or more suitable circuit configurations for processing a neural network, e.g., to satisfy one or more of the performance metrics.

At step 508, the controller may apply any number of single-bit or multi-bit configuration parameters to a selected circuit according to a selected circuit configuration to process the input data using the neural network to generate an output, e.g., an intermediate result that may be used in a subsequent layer of the neural network. It is understood that the same circuit may be used for more than one circuit configuration. Alternatively, two or more circuits, each having a different circuit configuration may be used.

Memory Self-Test and Initialization

In conventional general-purpose hardware accelerator implementations, operations such as testing, initializing, and clearing a large number of parameters from the accelerator's memory invariably consume a great amount of time and power. The resulting inefficiencies are in large part caused by the fact that such operations are typically performed in software. Depending on the size of an accelerator's memory, performing these operations comes at a cost that may be a significant portion of the overall computational cost.

To reduce time and energy cost for time and energy-intensive operations, various embodiments herein take advantage of a Built-In Self-Test (BIST) circuit. BISTs are readily available as a hardware function in existing memory cores and commonly used during a memory manufacturing or production test phase. Conventionally, a BIST circuit, in a self-test phase, cycles a sequence of known test patterns through cells in a memory array to verify proper circuit operation of the memory device, wherein each pattern tests a different interaction between adjacent cells to detect potential device failures. A dedicated BIST circuit typically empties or overwrites the contents of a set of registers to a predetermined value or state, e.g., by setting contents to zero or initializing the contents with a predetermined pattern.

In contrast, embodiments herein utilize aspects of a BIST circuit and a BIST routine in the context of reducing power consumption in machine learning accelerators. In embodiments, a BIST circuit's testing routine, ordinarily used to clear or initialize registers and memory in a hardware accelerator or other computing device, is modified and controlled to terminate at a stage when the content of a set of registers has been zeroed to create a known state for the accelerator. In this manner, e.g., during a startup and/or wakeup phase of the accelerator, no additional movements or transitions are required, advantageously saving time and energy. This is particularly useful when the capacity of an accelerator is well utilized, where many memory move operations would otherwise be required.

Figure 6:
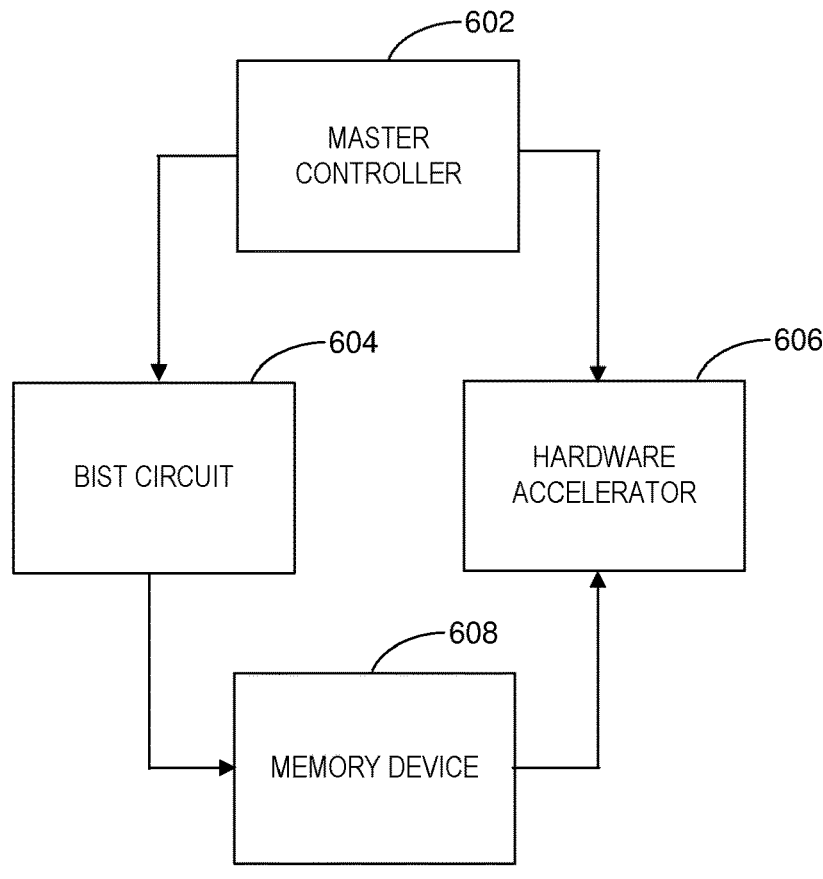
FIG. 6 illustrates a block diagram of an exemplary system for reducing power consumption in machine learning accelerators according to various embodiments of the present disclosure.

FIG. 6 illustrates a block diagram of an exemplary system for reducing power consumption in machine learning accelerators according to various embodiments of the present disclosure. System 600 comprises master controller 602, BIST circuit 604 (e.g., one or more BIST controllers or one or more BIST circuits), hardware accelerator 606, and memory device 608. In operation, master controller 602 may configure and control both BIST circuit 604 and hardware accelerator 606, which may read from memory device 608. Memory device 608 may be any memory device known in the art that can receive a test pattern, for example, at a set of dedicated pins.

It is understood that circuit 600 illustrated in FIG. 6 may comprise different or additional elements and/or connections. For example, master controller 602 may be used to initialize memory device 608, e.g., if memory device 608 is a single-port memory that may require configuration. Also, BIST circuit 604 may be coupled to a read/write logic block, which may be coupled to memory device 608. In embodiments, instead of BIST circuit 604 instructing memory device 608 directly, BIST circuit 604 may use the read/write logic block to trigger memory device 608 to perform a series of reads and writes and confirm the success or failure thereof. It is understood that BIST circuit may be configured to ignore a certain number of erroneous read/write values per access.

In embodiments, master controller 602 may communicate a command to BIST circuit 604 to instruct BIST circuit 604 to initiate a BIST routine that causes some or all of memory device 608 to assume a predetermined state. For example, the content of registers in memory device 608 may be set to zero to create a known state for hardware accelerator 606. Advantageously, this reduces power consumption by reducing the number of movements or transitions. It is noted that selecting zeroes as the predetermined values has the additional advantage that for some memory technologies, reading a "zero" from memory and/or moving it out of memory device 608 consumes less power than reading and/or moving a "one." Further, utilizing the zeroing feature of BIST circuit 604, advantageously, reduces hardware cost since no additional circuitry needs to be designed, implemented, or used, e.g., merely for the purpose of preparing hardware accelerator 606 to commence processing a CNN or other neural network. In embodiments, once memory device 608 has reached the predetermined state, BIST circuit 604 may terminate the BIST routine, e.g., by halting the cycling of known test patterns through memory device 608.

In various embodiments, master controller 602 may signal to BIST circuit 604 to run a test that may be used to determine whether a number of the bit cells in memory device 608 are in a properly working condition. In embodiments, test results may be used to determine a safety margin, e.g., based on a temperature, a frequency, and/or a voltage. In embodiments, master controller 602 or BIST circuit 604 may then determine a suitable frequency and/or voltage to adjust the margin, as needed. For example, if the margin is deemed too low, to reduce the risk of a device failure in memory device 608, a frequency may be decreased or a voltage may be increased accordingly.

FIG. 7 is a flowchart of an illustrative process for reducing power consumption in machine learning accelerators according to various embodiments of the present disclosure. In embodiments process 700 for reducing power may begin, at step 702, when a BIST circuit coupled to a memory device receives a command from a controller to initiate a BIST routine.

At step 704, the BIST circuit may then initiate a BIST routine that may comprise setting some or all of a memory device into a predetermined state to reduce a number of data movements or transitions, thereby reducing power consumption, e.g., during a startup phase or wakeup phase of a machine learning accelerator that processes one or more layers of a neural network.

At step 706, once the memory device has been put into the desired state, the BIST routine may be terminated. One skilled in the art shall recognize that: (1) certain steps herein may optionally be performed; (2) steps may not be limited to the specific order set forth herein; (3) certain steps may be performed in different orders; and (4) certain steps may be performed concurrently.

Figure 8:
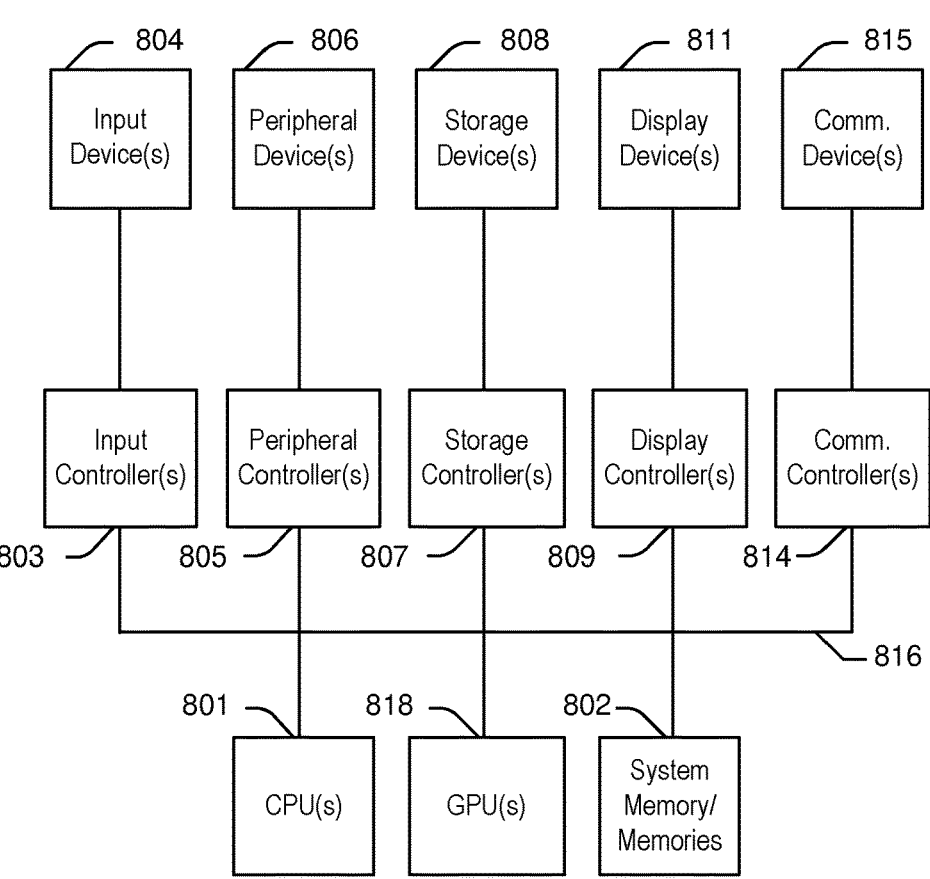
FIG. 8 depicts a simplified block diagram of a computing device/information handling system, in accordance with embodiments of the present disclosure.

FIG. 8 depicts a simplified block diagram of an information handling system (or computing system) according to embodiments of the present disclosure. It will be understood that the functionalities shown for system 800 may operate to support various embodiments of a computing system—although it shall be understood that a computing system may be differently configured and include different components, including having fewer or more components as depicted in FIG. 8.

As illustrated in FIG. 8, the computing system 800 includes one or more CPUs 801 that provides computing resources and controls the computer. CPU 801 may be implemented with a microprocessor or the like, and may also include one or more graphics processing units 819 and/or a floating-point coprocessor for mathematical computations. System 800 may also include a system memory 802, which may be in the form of random-access memory (RAM), read-only memory (ROM), or both.

A number of controllers and peripheral devices may also be provided, as shown in FIG. 8. An input controller 803 represents an interface to various input device(s) 804, such as a keyboard, mouse, touchscreen, and/or stylus. The computing system 800 may also include a storage controller 807 for interfacing with one or more storage devices 808 each of which includes a storage medium such as magnetic tape or disk, or an optical medium that might be used to record programs of instructions for operating systems, utilities, and applications, which may include embodiments of programs that implement various aspects of the present disclosure. Storage device(s) 806 may also be used to store processed data or data to be processed in accordance with the disclosure. The system 800 may also include a display controller 809 for providing an interface to a display device 811, which may be a cathode ray tube (CRT), a thin film transistor (TFT) display, organic light-emitting diode, electroluminescent panel, plasma panel, or other type of display. The computing system 800 may also include one or more peripheral controllers or interfaces 805 for one or more peripherals 808. Examples of peripherals may include one or more printers, scanners, input devices, output devices, sensors, and the like. A communications controller 814 may interface with one or more communication devices 815, which enables the system 800 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. Processed data and/or data to be processed in accordance with the disclosure may be communicated via the communications devices 815.

In the illustrated system, all major system components may connect to a bus 816, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as ASICs, programmable logic devices (PLDs), flash memory devices, and ROM and RAM devices.

Aspects of the present disclosure may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as ASICs, PLDs, flash memory devices, and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A method for partitioning computational resources to conserve power, the method comprising:
at a controller coupled to compute units, receiving network information, the compute units comprising neural network processors that comprise groups of sub-circuits, each sub-circuit representing at least one input channel;
using the network information to select fewer than all of the compute units to perform computing operations to reduce power consumption;
configuring the selected compute units to process input channel data and parameters associated with a neural network layer to obtain intermediate results;
locally storing the intermediate results close to the selected compute units to reduce a length of a data path to or from the selected compute units; and accumulating at least some of the intermediate results to generate output channel data.

2. The method according to claim 1, wherein at least one sub-circuit is a main local processor that communicates with one or more sub-circuits in a group of sub-circuits.

3. The method according to claim 1, wherein the controller evaluates at least one of a time use or an energy use for or more of the compute units to generate an intermediate result prior to determining a set of sub-circuits that process at least some of the input channel data.

4. The method according to claim 1, wherein the controller, based on a number of input channels, selectably disables access to power for one or more compute units to prevent them from processing at least some of the input channel data.

5. The method according to claim 4, wherein the controller assigns to one or more compute units a dedicated task that is performed independently from other compute units.

6. The method according to claim 4, wherein the controller, distributes the number of input channels across the one or more compute units.

7. The method according to claim 4, wherein at least one sub-circuit is a low-power logic circuit $$\frac{x}{y} + \frac{\sum_{y_T}^{x^T}}{45x} = \theta \in \{f, i\}.$$

8. A method for increasing computational efficiency, the method comprising:
at a controller, receiving single-bit and multi-bit configuration parameters, the controller coupled to compute units, the compute units comprising neural network processors that comprise groups of sub-circuits;
receiving input data that is single-bit data or multi-bit data;
using one or more configuration parameters to determine a set of performance metrics for a first circuit configuration, of the compute units, that uses single-bit configuration parameters and a second circuit configuration, of the compute units, that uses the multi-bit configuration parameters;
using one or more of the set of performance metrics to select at least one of the first circuit configuration or the second circuit configuration to process a neural network layer;
applying one or more of the single-bit configuration parameters or the multi-bit configuration parameters to the compute units according to the selected circuit configuration to process the input data; and
processing the neural network layer using the compute units based on application of the one or more of the single-bit configuration parameters or the multi-bit configuration parameters.

9. The method according to claim 8, wherein the controller determines that the neural network layer processes at least one of the single-bit data or the single-bit configuration parameters by identifying at least one of a size or width associated with the neural network layer.

10. The method according to claim 8, wherein the controller uses one or more multiplexers to prevent the one or more configuration parameters from being processed by one or more processors to reduce power consumption.

11. The method according to claim 8, wherein at least one of the first circuit configuration or the second circuit configuration comprises one or more convolutional neural network processors.

12. The method according to claim 8, wherein the first circuit configuration is a low-power logic circuit.

13. The method according to claim 8, wherein the one or more configuration parameters comprise at least one of a data parameter or a weight parameter.

14. The method according to claim 8, wherein the controller uses one or more multiplexers to prevent some or all of the input data from being processed by one or more processors to reduce power consumption.

15. A system for reducing power consumption in machine learning accelerators, the system comprising:

a machine learning accelerator;

a memory device coupled to the machine learning accelerator; and a master controller communicatively coupled with the machine learning accelerator and Built-In Self-Test (BIST) circuitry, the master controller causing the BIST circuitry to set at least a portion of the memory device to a predetermined state to reduce at least one of a number of movements or a number of transitions during at least one of a startup phase or wakeup phase of the machine learning accelerator.

16. The system according to claim 15, wherein setting at least the portion of the memory device to the predetermined state comprises setting contents of at least the portion of the memory device to a zero value.

17. The system according to claim 15, the BIST circuitry, in response to receiving a command from the master controller, initiates a BIST routine.

18. The system according to claim 17, wherein, in response to at least the portion of the memory device reaching the predetermined state, the master controller causing the BIST circuitry to terminate the BIST routine.

19. The system according to claim 15, the memory device receives a test pattern at a set of dedicated pins.

20. The system according to claim 15, the machine learning accelerator, following at least one of the startup phase or the wakeup phase, processes one or more layers of a neural network.

* * * * *